(12) United States Patent
Yoham

(10) Patent No.: US 9,155,412 B2
(45) Date of Patent: Oct. 13, 2015

(54) NAPKIN RING WITH REMOVABLE INSERT

(75) Inventor: Mark Addison Yoham, New York, NY (US)

(73) Assignee: Eventstyle, Inc., New York, NY (US)

( * ) Notice: Subject to any disclaimer, the term of this patent is extended or adjusted under 35 U.S.C. 154(b) by 222 days.

(21) Appl. No.: 13/481,271

(22) Filed: May 25, 2012

(65) Prior Publication Data

US 2012/0301653 A1 Nov. 29, 2012

Related U.S. Application Data

(60) Provisional application No. 61/491,115, filed on May 27, 2011.

(51) Int. Cl.
*A47G 21/16* (2006.01)
*A47G 19/00* (2006.01)

(52) U.S. Cl.
CPC ............. *A47G 21/16* (2013.01); *Y10T 428/216* (2015.01)

(58) Field of Classification Search
CPC ...... A47G 21/16; A47G 19/025; G09F 23/08; G09F 23/06
USPC .......................................... 428/66.6, 66.5, 13
See application file for complete search history.

(56) References Cited

FOREIGN PATENT DOCUMENTS

FR 2353255 * 2/1978

OTHER PUBLICATIONS

Abstract of French patent document 2353255.*

* cited by examiner

*Primary Examiner* — Alexander Thomas
(74) *Attorney, Agent, or Firm* — Katten Muchin Rosenman LLP

(57) ABSTRACT

A napkin ring can include a first transparent disc, a second transparent, and a decorative disc positioned between the first and second transparent discs. The first and second transparent discs can be retained adjacent to each other by a retention feature, which can be a first and second plurality of magnets disposed within the respective transparent discs.

20 Claims, 4 Drawing Sheets

NAPKIN RING WITH REMOVABLE INSERT

CLAIM FOR PRIORITY

This application claims priority under 35 U.S.C. §119(e) to U.S. Provisional Patent Application No. 61/491,115, filed on May 27, 2011, which is hereby incorporated by reference in its entirety.

TECHNICAL FIELD

The present invention relates to a napkin ring containing a removable insert.

BACKGROUND

A napkin ring holds a cloth napkin as part of a formal place setting. During use, the napkin is inserted through the napkin ring and is placed on a dinner table to improve the appearance and organization of the place setting. Thus, the napkin ring can be both functional and aesthetic.

DETAILED DESCRIPTION

Figure 1:
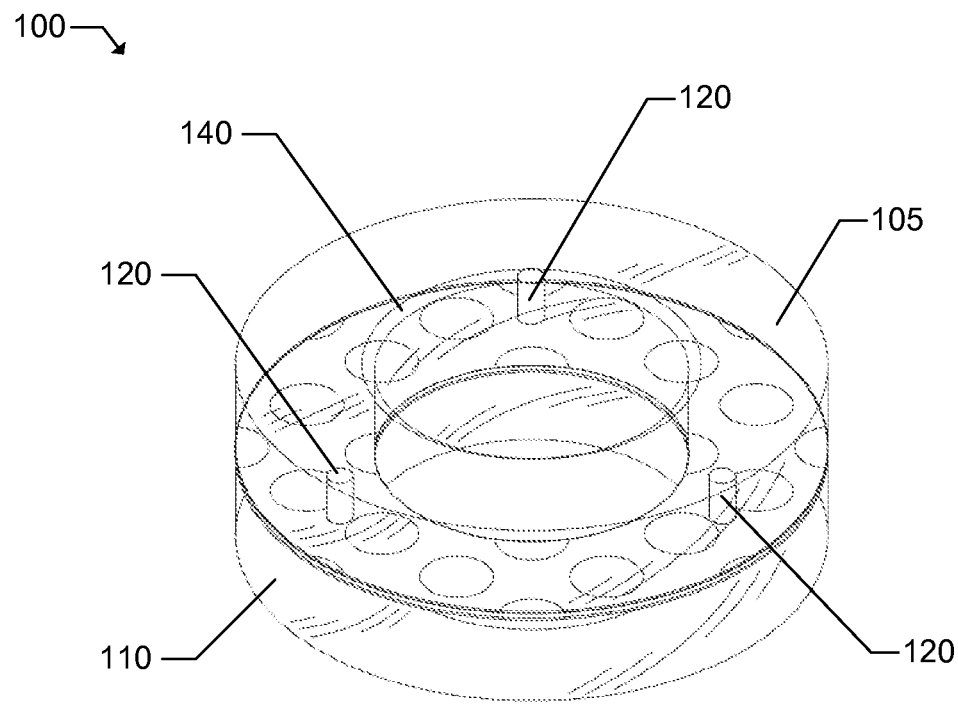
FIG. 1 is a top perspective view of a napkin ring.
Figure 6:
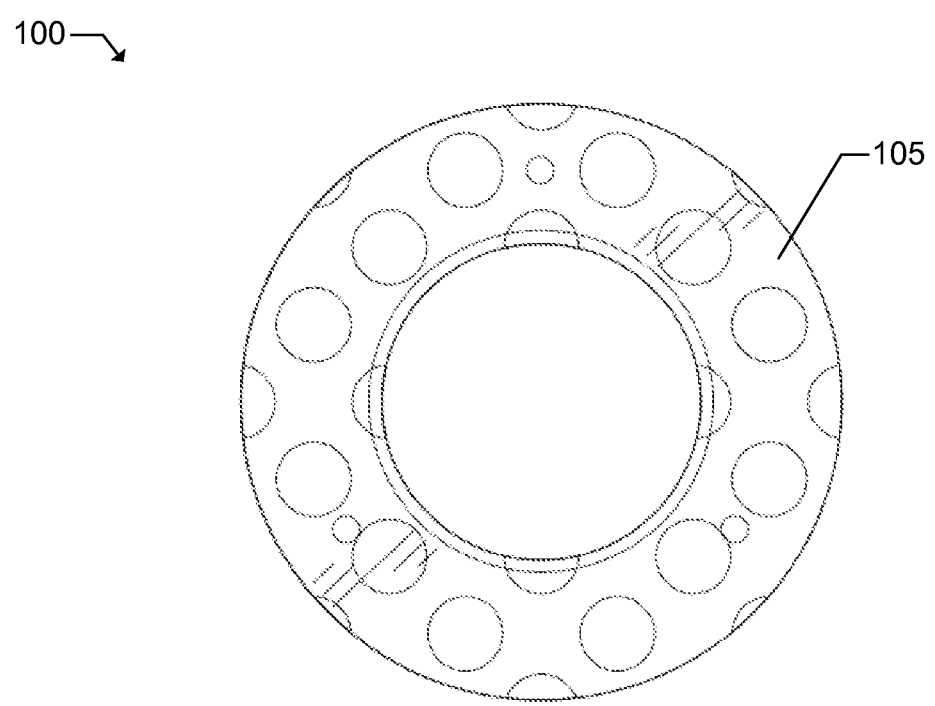
FIG. 6 is a top view of the napkin ring of FIG. 1.
Figure 7:
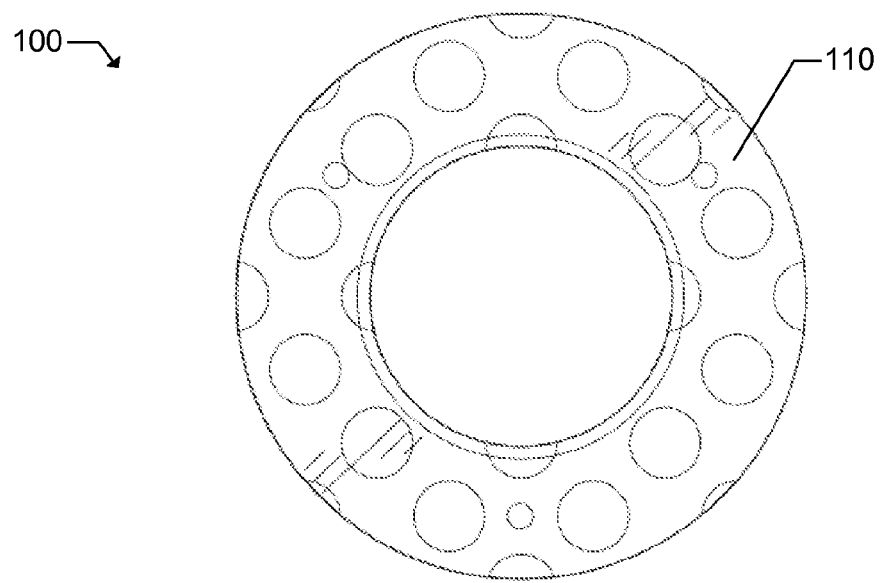
FIG. 7 is a bottom view of the napkin ring of FIG. 1.
Figure 8:
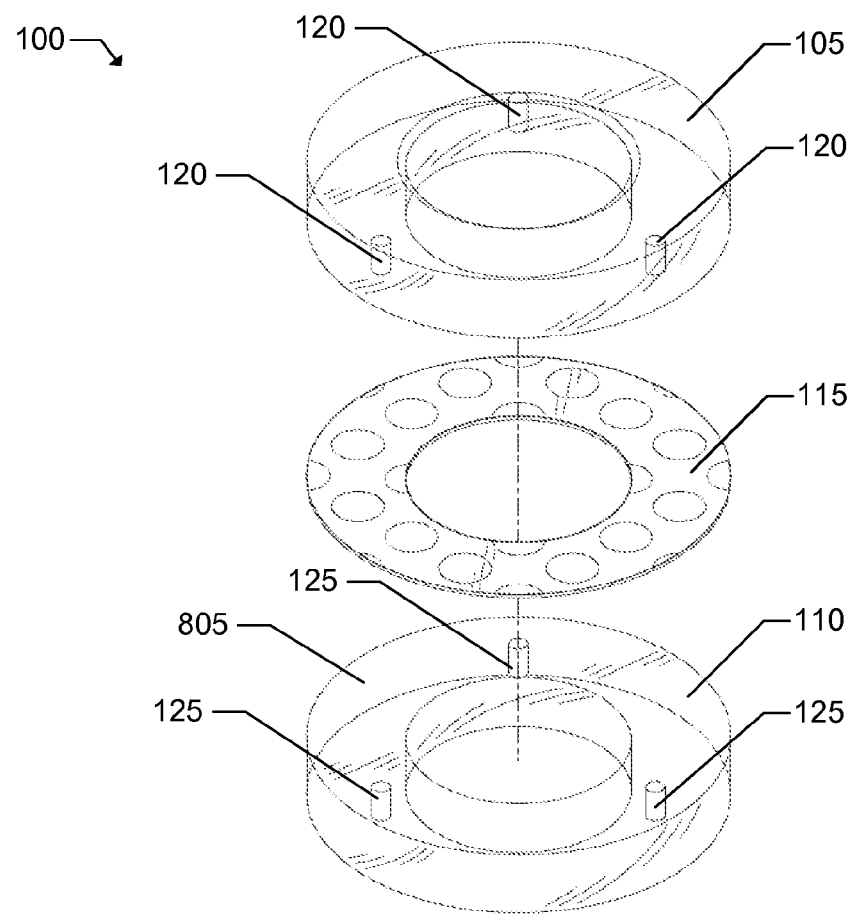
FIG. 8 is an exploded view of the napkin ring of FIG. 1.

A napkin ring 100 can include a first transparent disc 105 and a second transparent disc 110 adjacent to the first transparent disc, as shown in FIGS. 1 and 8. The first and second transparent discs (105, 110) can be at least partially transparent and can be made from any suitable material or materials such as, for example, plastic or glass. In one example, the first and second transparent discs (105, 110) can include acrylic. By using transparent discs, a removable decorative insert 115 can be visible within the napkin ring 100, as shown in FIGS. 1, 6, and 7.

The decorative insert 115 can be positioned between the first and second transparent discs (105, 110). The decorative insert 115 can be constructed of any suitable material such as, for example, paper, fabric or plastic. The decorative insert 115 can be removable and replaceable, thereby allowing the user to coordinate the napkin ring's appearance with a room's decor for a particular season, holiday, or event. The decorative insert 115 can have any suitable design, such as, for example, polka dots, floral patterns, concentric circles, or plaid. In another example, the decorative insert 115 can include solid colors, textures, or organic materials, such as wood veneer or pressed flowers, leaves, or herbs.

The first and second transparent discs (105, 110) can be held adjacent to one another by a retention feature. In one example, the retention feature can include magnets. For instance, the first transparent disc 105 can include a first plurality of magnets 120 and the second transparent disc 110 may include a second plurality of magnets 125, as shown in FIG. 8. In one example, the first plurality of magnets 120 can each have a first magnetic pole (e.g. north), and the second plurality of magnets 125 can each have a second magnetic pole (e.g. south) opposite the first magnetic pole. When the first transparent disc 105 is positioned adjacent to the second transparent disc 110, the first plurality of magnets 120 can be aligned with the second plurality of magnets 125 to retain the first transparent disc 105 adjacent to the second transparent disc 110 with the decorative insert 115 positioned between the first and second transparent discs (105,110).

In one example, the first plurality of magnets can be arranged so that opposing poles are proximate each other when the transparent discs are joined. For example, the first plurality of magnets 120 in the first transparent disc 105 can be arranged with a south pole of each magnet 120 facing toward the second transparent disc 110, and the second plurality of magnets 125 in the second transparent disc 110 can be arranged with a north pole of each magnet 125 facing toward the first transparent disc 105. Alternately, the poles of the magnets can be reversed without affecting functionality.

Figure 2:
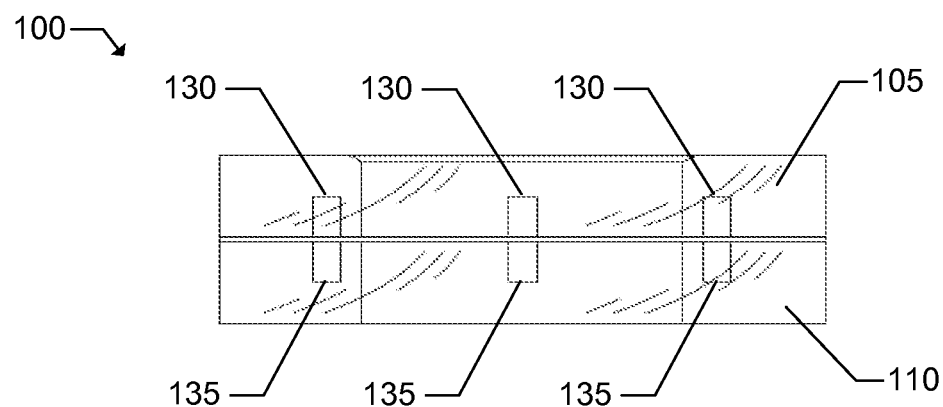
FIG. 2 is a front view of the napkin ring of FIG. 1.
Figure 3:
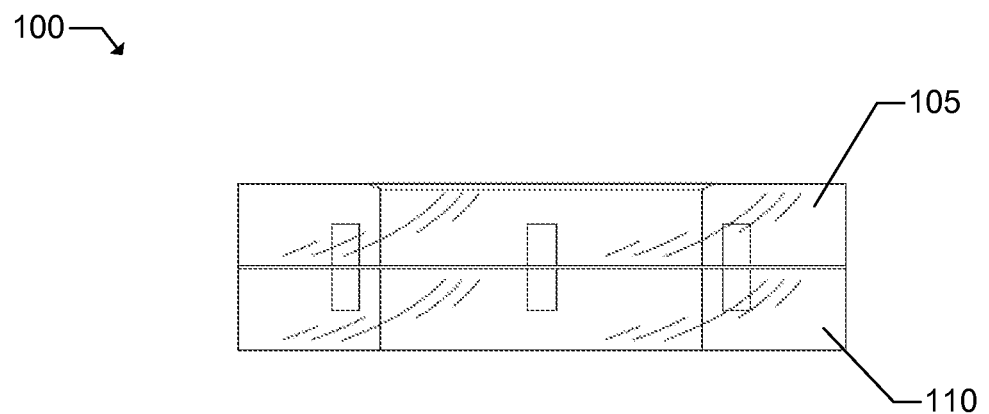
FIG. 3 is a rear view of the napkin ring of FIG. 1.
Figure 4:
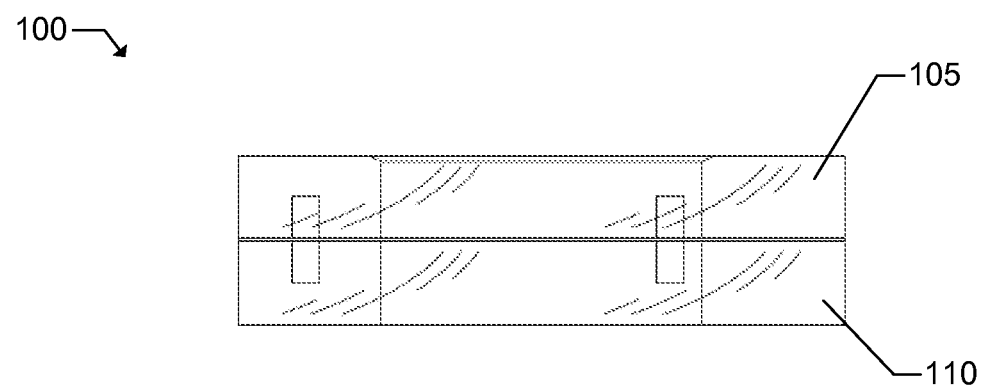
FIG. 4 is a left side view of the napkin ring of FIG. 1.
Figure 5:
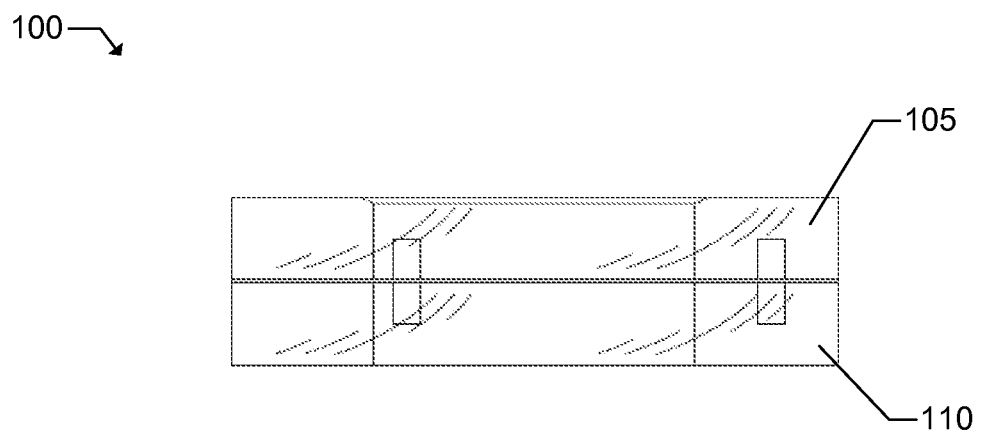
FIG. 5 is a right side view of the napkin ring of FIG. 1.

The magnets can be arranged in any suitable configuration or quantity and can be attached to each transparent disc in any suitable way. In one example, the magnets (e.g. 120, 125) can be disposed within magnet wells located in each transparent disc, as shown in FIGS. 2 and 3. More specifically, the first plurality of magnets 120 can be disposed within a first plurality of magnet wells 130 in the first transparent disc 105, and the second plurality of magnets 125 can be disposed within a second plurality of magnet wells 135 in the second transparent disc 110. In one example, the magnet wells can extend inward from an inner surface 805 of the transparent disc (e.g. 110), as shown in FIG. 8. The magnet wells (130, 135) can have any suitable depths to accommodate the magnets. For instance, the magnet wells can extend about halfway through each transparent disc. The magnets can be pressed into the magnet wells to provide an interference fit. Alternately, an adhesive can be used to retain each magnet in each well.

In one example, the magnets (e.g. 125) can be flush with the inner surface (e.g. 805) of the transparent disc (e.g. 110). In another example, the magnets (e.g. 125) can be recessed from the inner surface (e.g. 805) of the transparent disc (e.g. 110). In yet another example, the magnets (e.g. 125) can protrude beyond the inner surface (e.g. 805) of the transparent disc (e.g. 110), and the decorative insert 115 can include holes (not shown) aligned with the magnets (e.g. 125). In this configuration, the magnets can serve as locating pins by extending through the holes in the decorative insert 115 and thereby positioning and retaining the decorative insert between the first and second transparent discs (105, 110). Likewise, the magnets 125 can extend thorough the decorative insert 115 and into the first plurality of magnet wells 130 in the first transparent disc 105. In this configuration, the magnets can serve as locating pins and thereby prevent rotation of the first transparent disc relative to the second transparent disc. In one example, the magnets can be replaced with locating pins that provide an interference fit with corresponding wells in each transparent disc, and thereby serve as a retention feature to retain the first transparent disc 105 adjacent to the second transparent disc 110 with a decorative insert 115 between the first and second transparent discs.

To ease the process of feeding a cloth or paper napkin through the inner diameter of the napkin ring 100, the inner diameter of the first transparent disc 105 can include a beveled edge 140, as shown in FIG. 1. Although the second transparent disc 110 is not shown with a beveled edge, in one example, the second transparent disc 110 can have a beveled edge to ease insertion and removal of the napkin through its inner diameter.

Instead of magnets, the retention feature can include any suitable mechanical fastener or fasteners configured to retain the first transparent disc 105 adjacent to the second transparent disc 110 with a decorative insert 115 between the first and second transparent discs. The retention feature can include a latch, snap, Velcro (e.g., a hook-and-loop fastener), clip, pin, adhesive, or any other suitable feature for releasably securing the first transparent disc 105 to the second transparent disc 110. In one example, the retention feature can be similar to the feature used in a smoke detector for attaching the smoke detector to a base portion, where rotation of the first transparent disc 105 relative to the second transparent disc 110 is required to couple or decouple the discs. More specifically, rotation in a first direction can engage the first transparent disc 105 to the second transparent disc 110, and rotation in a second direction opposite the first direction can disengage the first transparent disc 105 from the second transparent disc 110.

The decorative insert 115 can include a pattern and can allow the napkin ring to be matched to a table setting or decor. By removing and replacing the decorative insert with a decorative insert having a different color or pattern, the appearance of the napkin ring can quickly and easily be changed for a relatively low cost. Consequently, a user does not need to purchase and store numerous napkin rings for various occasions. Instead, the user only needs to store a variety of decorative inserts 115, which are small, lightweight, and inexpensive and can easily be stacked and stored in a drawer. Consequently, the removable decorative insert provides a practical and cost-effective way to customize a table setting.

The transparent discs (105, 110) and decorative insert 115 can each have an outer diameter up to about 2 to 4 inches. More preferably, the transparent discs (105, 110) and decorative insert 115 can each have an outer diameter of about 2.5 to 3, and even more preferably, the transparent discs and decorative insert can each have an outer diameter of about 2.75 inches. The transparent discs (105, 110) and decorative insert 115 can each have an inner diameter of about 0.5 and 3 inches. More preferably, the transparent discs (105, 110) and decorative insert 115 can each have an inner diameter of about 1 to 2, and even more preferably, the transparent discs and decorative insert can each have an inner diameter of about 1.5 inches. The transparent discs (105, 110) can each have a thickness of about 0.125 to 1 inch. More preferably, the transparent discs (105, 110) can each have a thickness of about 0.25 to 0.5 inch, and even more preferably, the transparent discs (105, 110) can each have a thickness of about 0.375 inch. The insert 115 can have any suitable thickness that does not interfere with the functionality of the retention feature.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. For example, the socket and insert can be a single, cast piece including a retention device. It should also be understood that the appended drawings are not necessarily to scale, presenting a somewhat simplified representation of various features and basic principles of the invention.

The invention claimed is:

1. A napkin ring comprising:
   a first transparent disc;
   a second transparent disc adjacent to the first transparent disc; and
   a decorative insert positioned between the first and second transparent discs, wherein the decorative insert is removable.

2. The napkin ring of claim 1, further comprising a retention feature configured to retain the first transparent disc adjacent to the second transparent disc with the decorative insert positioned between the first and second transparent discs.

3. The napkin ring of claim 2, wherein the retention feature comprises: a first plurality of magnets disposed within the first transparent disc; and a second plurality of magnets disposed within the second transparent disc, wherein the first plurality of magnets align with the second plurality of magnets.

4. The napkin ring of claim 3, wherein the first plurality of magnets are disposed within a first plurality of magnet wells in the first transparent disc, and wherein the second plurality of magnets are disposed in a second plurality of magnet wells in the second transparent disc.

5. The napkin ring of claim 2, wherein the retention feature comprises a latch, snap, a hook-and-loop fastener, clip, or pin.

6. The napkin ring of claim 2, wherein the retention feature comprises an adhesive.

7. The napkin ring of claim 1, wherein the first transparent disc comprises plastic or glass.

8. The napkin ring of claim 1, wherein the second transparent disc comprises plastic or glass.

9. The napkin ring of claim 1, wherein the first and second transparent discs and the removable decorative insert each have outer diameters between about 2 and 4 inches.

10. The napkin ring of claim 9, wherein the first and second transparent discs and the decorative insert each have an outer diameter between about 2.5 and 3.5 inches.

11. The napkin ring of claim 10, wherein the first and second transparent discs and the decorative insert each have an outer diameter of about 2.75 inches.

12. The napkin ring of claim 1, wherein the first and second transparent discs and the decorative insert each have an inner diameter between about 0.5 and 3 inches.

13. The napkin ring of claim 12, wherein the first and second transparent discs and the decorative insert each have an inner diameter between about 1 and 2 inches.

14. The napkin ring of claim 13, wherein the first and second transparent discs and the decorative insert each have an inner diameter of about 1.5 inches.

15. The napkin ring of claim 1, wherein the first and second transparent discs each have a thickness between about 0.125 and 1 inch.

16. The napkin ring of claim 15, wherein the first and second transparent discs each have a thickness between about 0.25 and 0.5 inch.

17. The napkin ring of claim 16, wherein the first and second transparent discs each have a thickness of about 0.375 inch.

18. The napkin ring of claim 1, wherein the first transparent disc comprises a bevel on an inner diameter of an outward facing surface.

19. A table setting, comprising:
   a first layer;
   a second, transparent layer adjacent to the first layer;
   magnetic structure configured to hold together the first and second layers; and
   a decorative insert positioned between the first and second layers, wherein the decorative insert is removable.

20. The table setting according to claim 19, wherein the first layer comprises a transparent layer.

* * * * *